(12) United States Patent
Kouda et al.

(10) Patent No.: US 11,370,252 B2
(45) Date of Patent: Jun. 28, 2022

(54) PNEUMATIC TIRE

(71) Applicant: The Yokohama Rubber Co., LTD., Tokyo (JP)

(72) Inventors: Hiraku Kouda, Hiratsuka (JP); Takayuki Shiraishi, Hiratsuka (JP); Tatsuro Shinzawa, Hiratsuka (JP); Takanori Uemura, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 295 days.

(21) Appl. No.: 16/329,187

(22) PCT Filed: Aug. 30, 2017

(86) PCT No.: PCT/JP2017/031206
§ 371 (c)(1),
(2) Date: Feb. 27, 2019

(87) PCT Pub. No.: WO2018/043581
PCT Pub. Date: Mar. 8, 2018

(65) Prior Publication Data
US 2019/0184752 A1    Jun. 20, 2019

(30) Foreign Application Priority Data

Aug. 31, 2016    (JP) .............................. JP2016-169033

(51) Int. Cl.
*B60C 11/12* (2006.01)
*B60C 11/03* (2006.01)
*B60C 11/13* (2006.01)

(52) U.S. Cl.
CPC .......... *B60C 11/0306* (2013.01); *B60C 11/03* (2013.01); *B60C 11/12* (2013.01);
(Continued)

(58) Field of Classification Search
CPC .......... B60C 11/1218; B60C 11/12–13; B60C 2011/0381; B60C 2011/0383;
(Continued)

(56) References Cited

U.S. PATENT DOCUMENTS 6,405,772 B1    6/2002    Suzuki et al.
2002/0112800 A1    8/2002    Suzuki et al.
(Continued)

FOREIGN PATENT DOCUMENTS

EP    3208113 A1 *    8/2017    ......... B60C 11/1281
JP    2001219715        8/2001
(Continued)

OTHER PUBLICATIONS

JP 2014218101A Machine Translation; Yahashi, Masahiro (Year: 2014).*

(Continued)

*Primary Examiner* — Robert C Dye
*Assistant Examiner* — Nicholas J Weiler
(74) *Attorney, Agent, or Firm* — Thorpe North & Western

(57) ABSTRACT

Provided is a pneumatic tire including a plurality of main grooves extending in the tire circumferential direction in a tread portion and including a sipe extending in a tire width direction on a rib defined by a main groove, the sipe includes a leading side edge and a trailing side edge, a chamfered portion shorter than a sipe length of the sipe is formed in each of the leading side edge and the trailing side edge, a non-chamfered region including no other chamfered portion is present in a part facing each chamfered portion of the sipe, and the rib includes an intersecting groove intersecting with at least one out of the sipe and the chamfered portion.

16 Claims, 11 Drawing Sheets

(52) U.S. Cl.
CPC ........ *B60C 11/1204* (2013.01); *B60C 11/125* (2013.01); *B60C 11/1259* (2013.01); *B60C 11/13* (2013.01); *B60C 11/1307* (2013.01); B60C 2011/0348 (2013.01); B60C 2011/0351 (2013.01); B60C 2011/1213 (2013.01)

(58) Field of Classification Search
CPC ......... B60C 2011/0358–0386; B60C 11/1204; B60C 11/04; B60C 11/1281; B60C 11/0311; B60C 11/1259; B60C 11/1384; B60C 11/1392
See application file for complete search history.

(56) References Cited

U.S. PATENT DOCUMENTS

| | | | |
|---|---|---|---|
| 2009/0255614 A1* | 10/2009 | Ebiko | B60C 11/0306 152/209.8 |
| 2010/0084062 A1 | 4/2010 | Miyazaki et al. | |
| 2010/0212795 A1* | 8/2010 | Murata | B60C 11/0304 152/209.18 |
| 2013/0206298 A1 | 8/2013 | Guillermou et al. | |
| 2015/0151584 A1* | 6/2015 | Koishikawa | B60C 11/13 152/209.18 |
| 2016/0023520 A1* | 1/2016 | Funaki | B60C 11/0327 152/209.18 |
| 2016/0144666 A1* | 5/2016 | Yoshida | B60C 11/1259 152/209.24 |
| 2016/0152090 A1* | 6/2016 | Takemoto | B60C 11/0306 152/209.24 |
| 2017/0157989 A1* | 6/2017 | Barbarin | B60C 11/1218 |
| 2019/0001753 A1* | 1/2019 | Hayashi | B60C 11/04 |

FOREIGN PATENT DOCUMENTS

| | | | | |
|---|---|---|---|---|
| JP | 2005075213 A | * | 3/2005 | |
| JP | 2012171479 A | * | 9/2012 | |
| JP | 2013537134 | | 9/2013 | |
| JP | 2014218101 A | * | 11/2014 | |
| JP | 2015160487 | | 9/2015 | |
| JP | 2016101802 | | 6/2016 | |
| WO | WO 2007/028438 | | 3/2007 | |
| WO | WO2012032144 | | 3/2012 | |
| WO | WO-2015197429 A1 | * | 12/2015 | ......... B60C 11/1259 |
| WO | WO2016125814 | | 8/2016 | |
| WO | WO2017141651 | | 8/2017 | |
| WO | WO-2017141651 A1 | * | 8/2017 | ......... B60C 11/1392 |
| WO | WO2017141912 | | 8/2017 | |
| WO | WO2017141914 | | 8/2017 | |
| WO | WO-2017217425 A1 | * | 12/2017 | ......... B60C 11/1236 |

OTHER PUBLICATIONS

WO 2017141651 Machine Translation; Morito, Takumi (Year: 2017).*
JP 2012171479 Machine Translation; Miyasaka, Atsushi (Year: 2012).*
JP 2005075213 Machine Translation; Nakajima, Takehiko (Year: 2005).*
International Search Report for International Application No. PCT/JP2017/031206 dated Nov. 28, 2017, 4 pages, Japan.

* cited by examiner

PNEUMATIC TIRE

TECHNICAL FIELD

The present technology relates to a pneumatic tire, and more particularly, to a pneumatic tire capable of improving steering stability performance on dry road surfaces and improving steering stability performance on wet road surfaces in a compatible manner by devising a chamfered shape of a sipe.

BACKGROUND ART

Conventionally, in a tread pattern of a pneumatic tire, a plurality of sipes are formed on ribs defined by a plurality of main grooves. Such sipes are provided such that drainage properties are ensured and steering stability performance on wet road surfaces is achieved. However, when a large number of sipes are disposed in the tread portion for improving the steering stability performance on wet road surfaces, the rigidity of the rib is reduced, so there is a disadvantage that steering stability performance on dry road surfaces is deteriorated.

Various proposals have been made on pneumatic tires in which sipes are formed in a tread pattern and chamfered (see, for example, Japan Patent Publication No. 2013-537134). When forming a sipe and chamfering it, the edge effect may be lost depending on the shape of chamfer, and improvement in steering stability performance on dry road surfaces or steering stability performance on wet road surfaces may be insufficient depending on the chamfering size.

SUMMARY

The present technology provides a pneumatic tire capable of achieving improvement in steering stability performance on dry road surfaces and improvement in steering stability performance on wet road surfaces in a compatible manner by devising a chamfer shape of a sipe.

A pneumatic tire of the present technology includes a plurality of main grooves extending in a tire circumferential direction in a tread portion; and a sipe extending in a tire width direction in a rib defined by the main grooves, wherein, the sipe includes a leading side edge and a trailing side edge, a chamfered portion shorter than a sipe length of the sipe is formed in each of the leading side edge and the trailing side edge, a non-chamfered region including no other chamfered portion is present in a part facing each chamfered portion of the sipe, and the rib includes an intersecting groove that intersects with at least one out of the sipe and the chamfered portion.

According to the present technology, in a pneumatic tire including a sipe extending in the tire width direction on a rib defined by a main groove, while a chamfered portion shorter than the sipe length of the sipe is formed in each of the leading side edge and the trailing side edge of the sipe, there is a non-chamfered region including no chamfered portion in the part facing each chamfered portion in the sipe, thereby improving the drainage effect based on the chamfered portion and at the same time the non-chamfered region is capable of effectively removing the water film by the edge effect. This thereby enables steering stability on wet road surfaces to be significantly improved. Moreover, since the chamfered portion and the non-chamfered region are mixed in each of the leading side edge and the trailing side edge, the beneficial effect of improving the wet performance as described above may be maximized at the time of braking and at the time of accelerating. Further, compared to the sipe chamfered in a conventional manner, since the area to be chamfered can be minimized, improvement in steering stability performance on dry road surfaces is enabled. As a result, improvement in steering stability performance on dry road surfaces and improvement in steering stability performance on wet road surfaces in a compatible manner is achieved. Furthermore, having an intersecting groove intersecting with at least one out of the sipe and the chamfered portion enables the drainability to be improved and the steering stability performance on wet road surfaces to be improved.

According to the present technology, it is preferable that a maximum depth x (mm) of the sipe and a maximum depth y (mm) of the chamfered portion satisfy a relationship of a following formula (1), and a sipe width of the sipe is constant in a range from an end positioned inward of the chamfered portion in a tire radial direction to a groove bottom of the sipe. Thus, compared to the sipe chamfered in a conventional manner, minimizing the area to be chamfered is made possible, enabling the steering stability performance on dry road surfaces to be improved. As a result, achieving improvement in steering stability performance on dry road surfaces and improvement in steering stability performance on wet road surfaces in a compatible manner is enabled.

$$x \times 0.1 \leq y \leq x \times 0.3 + 1.0 \tag{1}$$

According to the present technology, it is preferable that at least one end of the intersecting groove opens to the main groove. As a result, the drainability is improved, enabling the steering stability performance on wet road surfaces to be improved.

According to the present technology, it is preferable that the intersecting groove extends along the tire circumferential direction. As a result, the drainability is improved, enabling the steering stability performance on wet road surfaces to be improved.

According to the present technology, it is preferable that the intersecting groove intersects both with the sipe and the chamfered portion. As a result, the drainability is further improved, enabling the steering stability performance on wet road surfaces to be effectively improved.

According to the present technology, it is preferable that the rib includes a plurality of units including a sipe and a chamfered portion, and the intersecting groove intersects the sipe or chamfered portion of the plurality of units. As a result, the drainability is improved enabling the steering stability performance on wet road surfaces to be improved.

According to the present technology, it is preferable that the intersecting groove includes a chamfered portion. This thereby enables the steering stability performance on wet road surfaces to be effectively improved.

According to the present technology, it is preferable that the maximum depth z (mm) of the intersecting groove and the maximum depth x (mm) of the sipe satisfy the relationship of the following formula (2). More preferably, the relation of $x \times 0.5 \leq z \leq x \times 0.8$ is satisfied. This thereby enables steering stability performance on dry road surfaces and steering stability performance on wet road surfaces to be improved in a well-balanced manner.

$$x \times 0.2 \leq z \leq x \tag{2}$$

According to the present technology, it is preferable that the maximum width W2 (mm) of the intersecting groove satisfies the relationship of 1.5 mm<W2≤7.0 mm. More preferably, the relationship of 2.0 mm ≤W2≤5.0 mm is satisfied. This thereby enables steering stability performance on dry road surfaces and steering stability performance on wet road surfaces to be improved in a well-balanced manner.

BRIEF DESCRIPTION OF DRAWINGS

FIGS. 8A to 8E are plan views of the respective modified examples.

FIGS. 10A and 10B are plan views of the respective modified examples.

DETAILED DESCRIPTION

Figure 1:
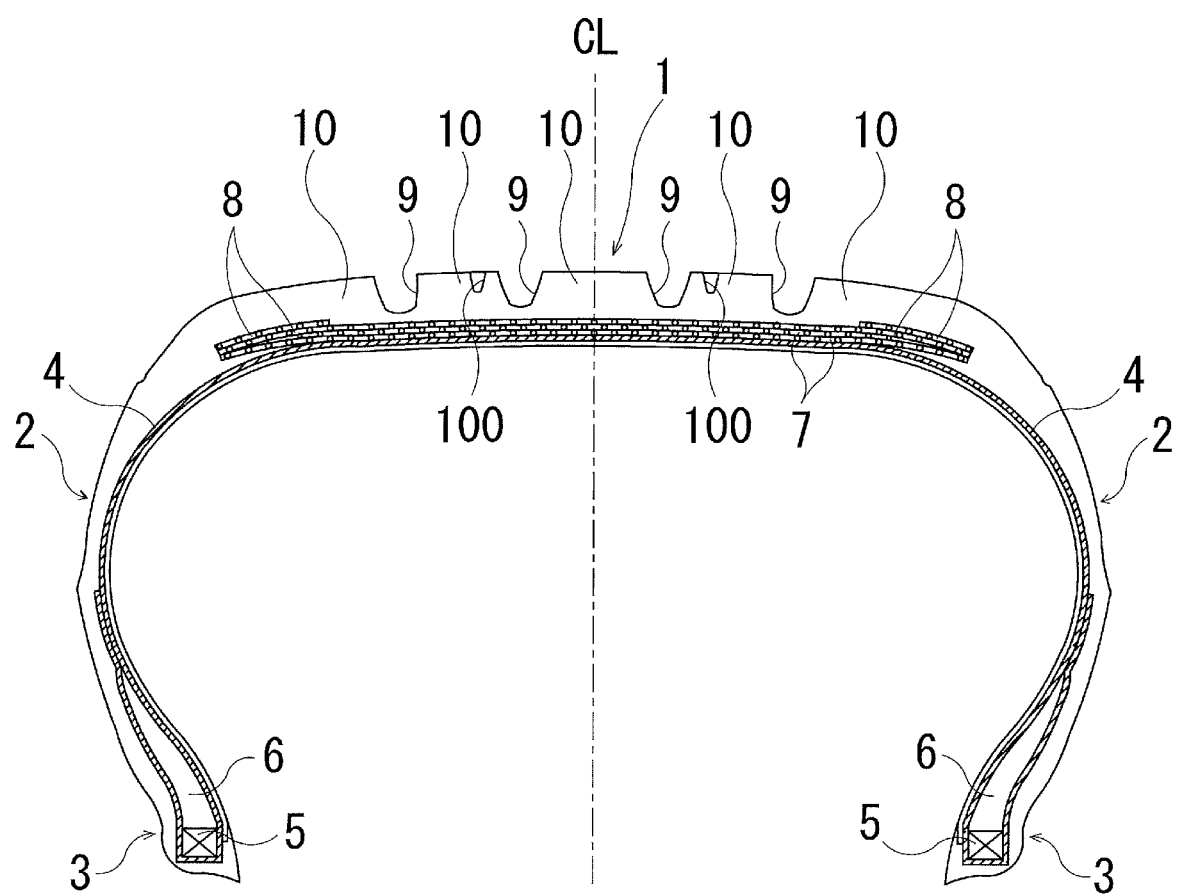
FIG. 1 is a meridian cross-sectional view illustrating a pneumatic tire according to an embodiment of the present technology.

The configuration of embodiments of the present technology is described in detail below with reference to the accompanying drawings. In FIG. 1, CL is the tire equatorial plane.

As illustrated in FIG. 1, a pneumatic tire according to embodiments of the present technology includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from rubber composition is disposed on the outer circumference of the bead core 5.

A plurality of belt layers 7 are embedded on an outer circumferential side of the carcass layer 4 in the tread portion 1. The belt layers 7 include a plurality of reinforcing cords that are inclined with respect to the tire circumferential direction with the reinforcing cords of the different layers arranged in a criss-cross manner. In the belt layers 7, an inclination angle of the reinforcing cords with respect to the tire circumferential direction ranges from, for example, 10° to 40°. Steel cords are preferably used as the reinforcing cords of the belt layers 7. To improve high-speed durability, at least one belt cover layer 8 formed by arranging reinforcing cords at an angle of, for example, not greater than 5° with respect to the tire circumferential direction, is disposed on an outer circumferential side of the belt layers 7. Nylon, aramid, or similar organic fiber cords are preferably used as the reinforcing cords of the belt cover layer 8.

Also, a plurality of main grooves 9 extending in the tire circumferential direction is formed in the tread portion 1. These main grooves 9 define the tread portion 1 into a plurality of rows of ribs 10. Note that, according to the present technology, the main groove 9 is a groove including a wear indicator.

Note that the tire internal structure described above represents a typical example for a pneumatic tire, and the pneumatic tire is not limited thereto.

Figure 2:
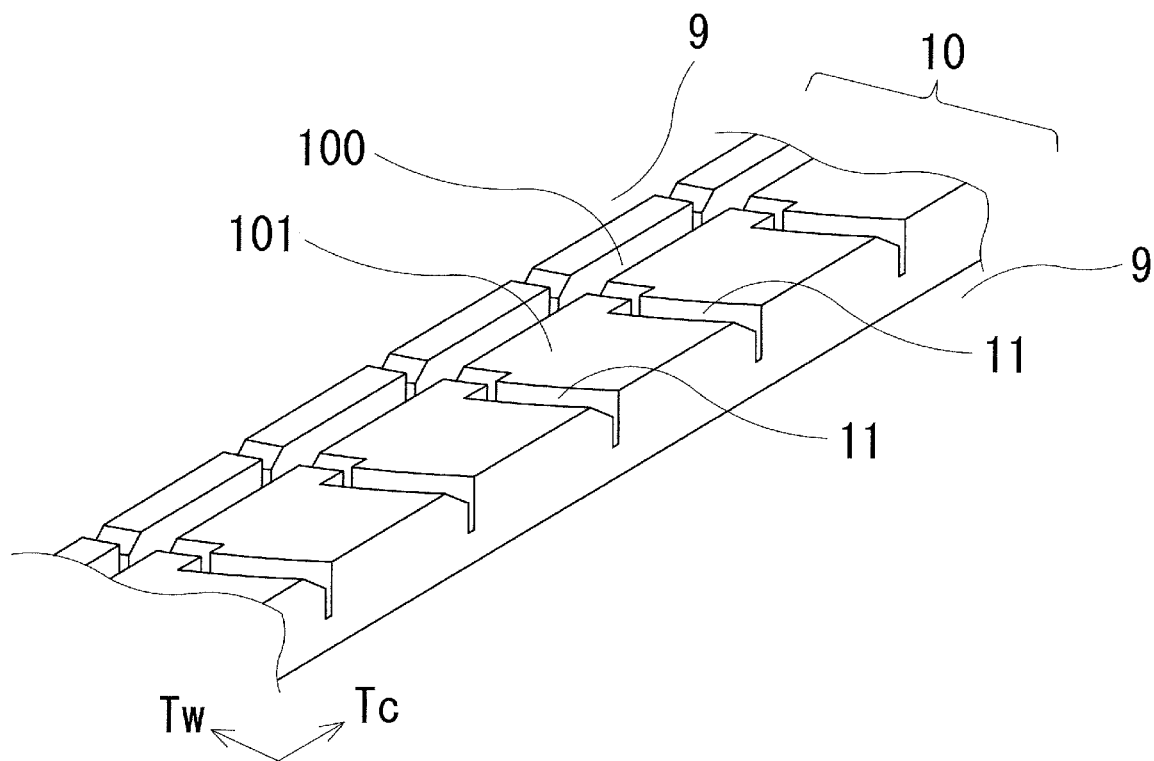
FIG. 2 is a perspective view illustrating part of a tread portion of a pneumatic tire according to the present technology.
Figure 3:
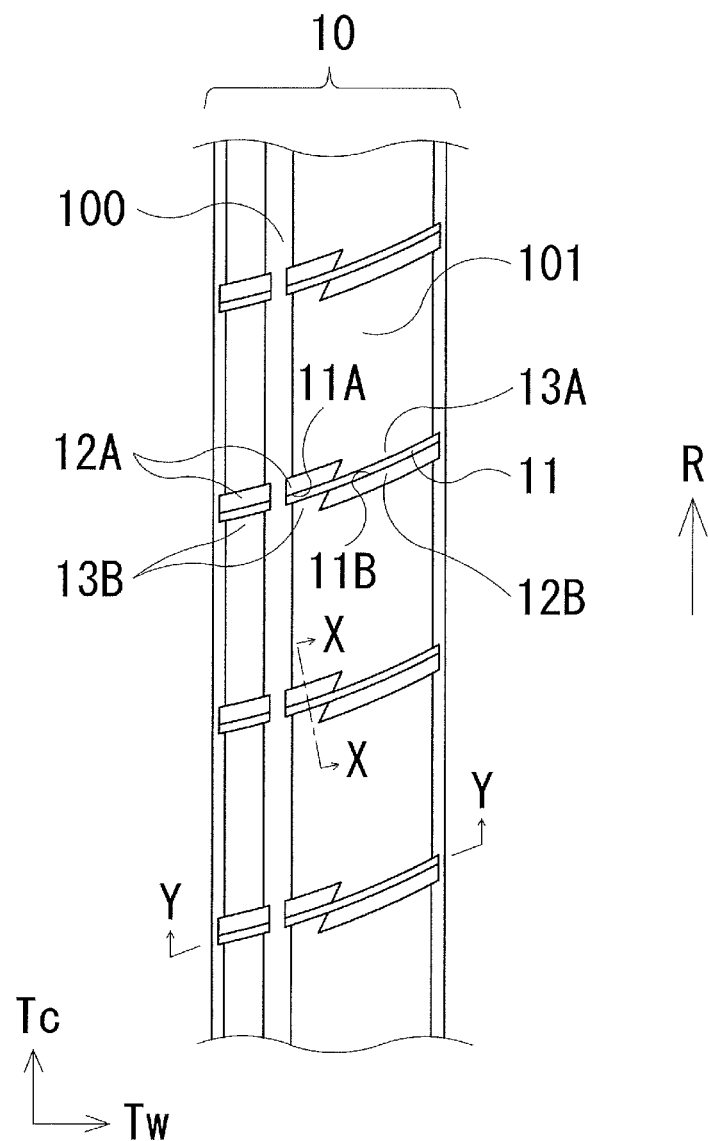
FIG. 3 is a plan view illustrating part of a tread portion of a pneumatic tire according to the present technology.
Figure 4:
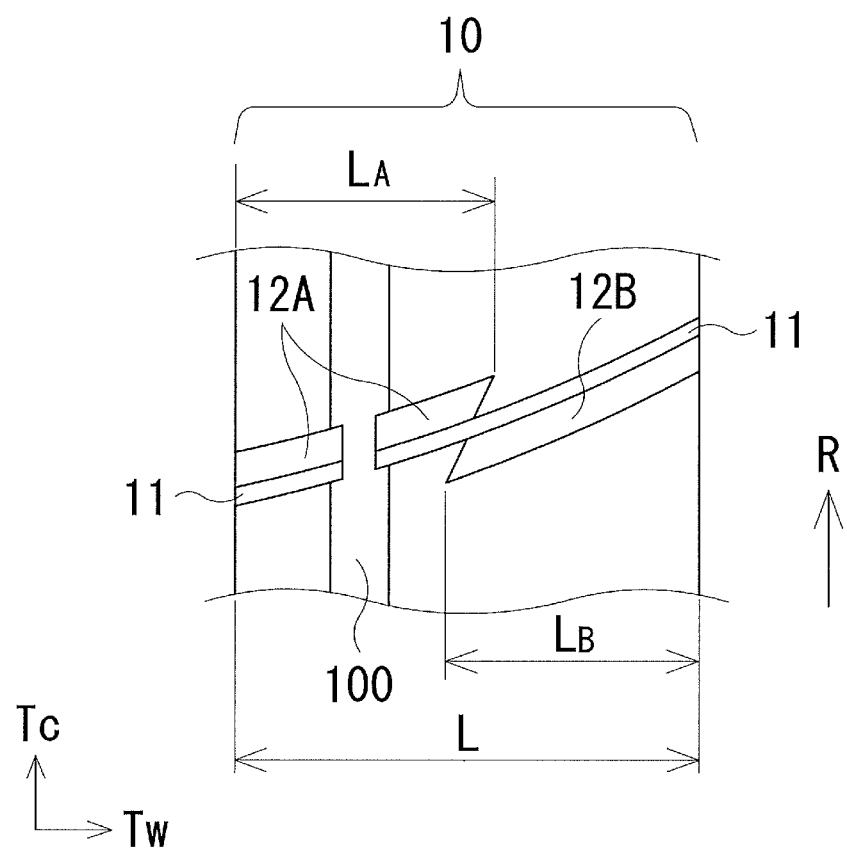
FIG. 4 is a plan view illustrating a sipe, a chamfered portion thereof, and an intersecting groove formed in the tread portion of FIG. 3.

FIGS. 2 to 4 illustrate a part of the tread portion 1, Tc indicates the tire circumferential direction, and Tw indicates the tire width direction. As illustrated in FIGS. 2 and 3, the rib 10 includes a plurality of sipes 11 extending in the tire width direction, an intersecting groove 100 intersecting with at least one out of the sipe 11 and a chamfered portion 12 provided thereat, and a block 101 defined by these sipes 11. The plurality of blocks 101 are arranged to line up in the tire circumferential direction.

The intersecting groove 100 illustrated in FIGS. 2 and 3 is a narrow groove extending along the tire circumferential direction in parallel with the main grooves 9. As a result, the drainability is improved, which contributes to the improvement in steering stability performance on wet road surfaces. FIGS. 2 and 3 illustrate embodiments in which the intersecting groove 100 extends along the tire circumferential direction, but the intersecting groove 100 may be formed such that one end communicates with the main groove 9 and the other end terminates within the rib 10. Even in a case in which one end of the intersecting groove 100 communicates with the main groove 9 and the other end terminates within the rib 10, the intersecting groove 100 is formed such as to intersect with at least one out of the sipe 11 and the chamfered portion 12. Note that, according to the present technology, the intersecting groove 100 is a groove including no wear indicator.

The sipe 11 is a narrow groove having a groove width of 1.5 mm or less. The sipe 11 is an open sipe extending through the rib 10 in the tire width direction. Namely, both ends of the sipe 11 communicate with the main grooves 9 adjacent the rib 10. Alternatively, according to the present technology, the sipe 11 may be formed as a semi-closed sipe in which only one end thereof communicates with the main groove 9. Namely, the structure has one end of the sipe 11 communicating with the main groove 9 located on one side of the rib 10, with the other end terminating within the rib 10.

As illustrated in FIG. 3, the sipe 11 has a curved shape as a whole, and is formed in the rib 10 at intervals in the tire circumferential direction. Further, the sipe 11 includes an edge 11A which is on the leading side with respect to the rotation direction R, and an edge 11B which is on the trailing side with respect to the rotation direction R. A chamfered portion 12 is formed on each of the edge 11A on the leading side and the edge 11B on the trailing side.

The chamfered portion 12 includes a chamfered portion 12A which is on the leading side with respect to the rotation direction R and a chamfered portion 12B which is on the trailing side with respect to the rotation direction R. There is a non-chamfered region 13 including no chamfered portion in the part facing the chamfered portion 12. Namely, there is a non-chamfered region 13B which is on the trailing side with respect to the rotational direction R at a part facing the chamfered portion 12A and a non-chamfered region 13A which is on the leading side with respect to the rotational direction R at a part facing the chamfered portion 12B. In this manner, the chamfered portion 12 and the non-chamfered region 13 including no chamfered portion are disposed adjacent to each other on each of the edge 11A on the leading side and the edge 11B on the trailing side of the sipe 11.

As illustrated in FIG. 4, in the sipe 11 and the chamfered portions 12A and 12B, the length in the tire width direction is set as the sipe length L, the chamfered lengths $L_A$ and $L_B$, respectively. These sipe length L and the chamfered lengths $L_A$ and $L_B$ are the length in the tire width direction from one end to the other end of each of the sipes 11 or the chamfered portions 12A and 12B. The chamfered lengths $L_A$ and $L_B$ of the chamfered portions 12A and 12B are both formed to be shorter than the sipe length L of the sipe 11. Note that, the sipe length L and the chamfered lengths $L_A$, $L_B$ are the length in the tire width direction including the groove width of the intersecting groove 100 to be described later.

In the above-described pneumatic tire, by providing a chamfered portion 12 shorter than the sipe length L of the sipe 11 in each of a leading side edge 11A and a trailing side edge 11B of the sipe 11, and since there is a non-chamfered region 13 including no chamfered portion in the part facing each chamfered portion 12 in the sipe 11, the drainage effect is improved based on the chamfered portion 12 and at the same time the non-chamfered region 13 is capable of effectively removing the water film by the edge effect. This thereby enables steering stability on wet road surfaces to be significantly improved. Moreover, since the chamfered portion 12 and the non-chamfered region 13 including no chamfered portion are mixed in each of the leading side edge 11A and the trailing side edge 11B, the beneficial effect of improving the wet performance as described above may be maximized at the time of braking and at the time of accelerating. Furthermore, having an intersecting groove 100 intersecting with at least one out of the sipe 11 and the chamfered portion 12 enables the drainability to be improved and the steering stability performance on wet road surfaces to be improved.

Figure 5:
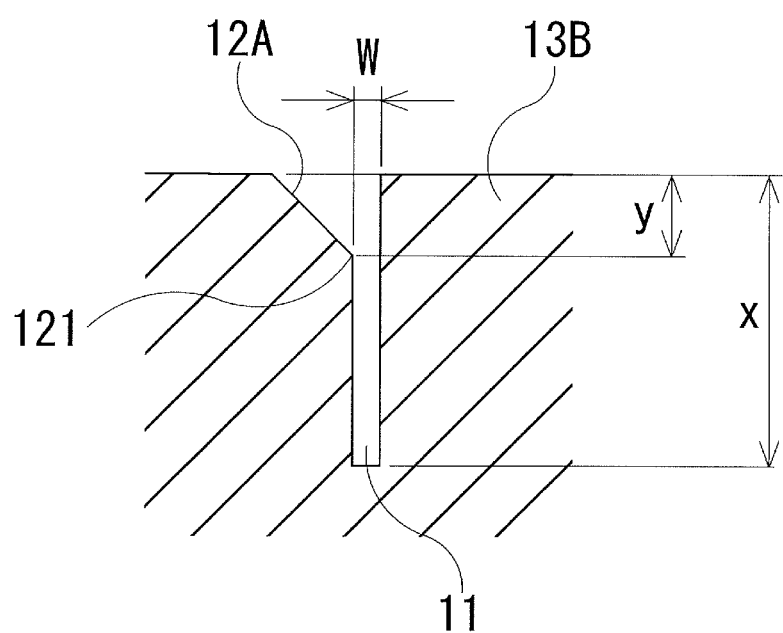
FIG. 5 is a cross-sectional view taken along the line X-X in FIG. 3.

FIG. 5 is a cross-sectional view perpendicular to the sipe 11 and illustrating a cutout of the tread portion 1 in the vertical direction. As illustrated in FIG. 5, when the maximum depth of the sipe 11 is set as x (mm) and the maximum depth of the chamfered portion 12 is set as y (mm), the sipe 11 and the chamfered portion 12 are formed such that the maximum depth x (mm) and the maximum depth y (mm) satisfy the relationship of the following formula (1). The maximum depth x of the sipe 11 is preferably from 3 mm to 8 mm. The sipe width W of the sipe 11 is substantially constant in a range from the end 121 located on the inner side in the tire radial direction of the chamfered portion 12 to the groove bottom of the sipe 11. The sipe width W is determined such that the width is the substantially measured width of the sipe 11, for example, in a case that a ridge exists on the groove wall of the sipe 11, by not including the height of the ridge in the sipe width, or in a case that the sipe width of the sipe 11 gradually narrows toward the groove bottom, by not including the narrowed portion in the sipe width.

$$x \times 0.1 \leq y \leq x \times 0.3 + 1.0 \qquad (1)$$

In the pneumatic tire described above, it is preferable that the maximum depth x (mm) and the maximum depth y (mm) satisfy the relationship of the above formula (1). By providing the sipe 11 and the chamfered portion 12 so as to satisfy the relationship of the above-described formula (1), the area to be chamfered can be minimized compared with a sipe chamfered in a conventional manner. This enables steering stability performance on dry road surfaces to be improved. As a result, achieving improvement in steering stability performance on dry road surfaces and improvement in steering stability performance on wet road surfaces in a compatible manner is enabled. Here, if y<x×0.1, the drainage effect based on the chamfered portion 12 becomes insufficient, and conversely, if y>x×0.3+1.0, the rigidity of the rib 10 deteriorates, lowering the steering stability performance on dry road surfaces. It is particularly preferable to satisfy the relation y≤x×0.3+0.5.

Figure 6:
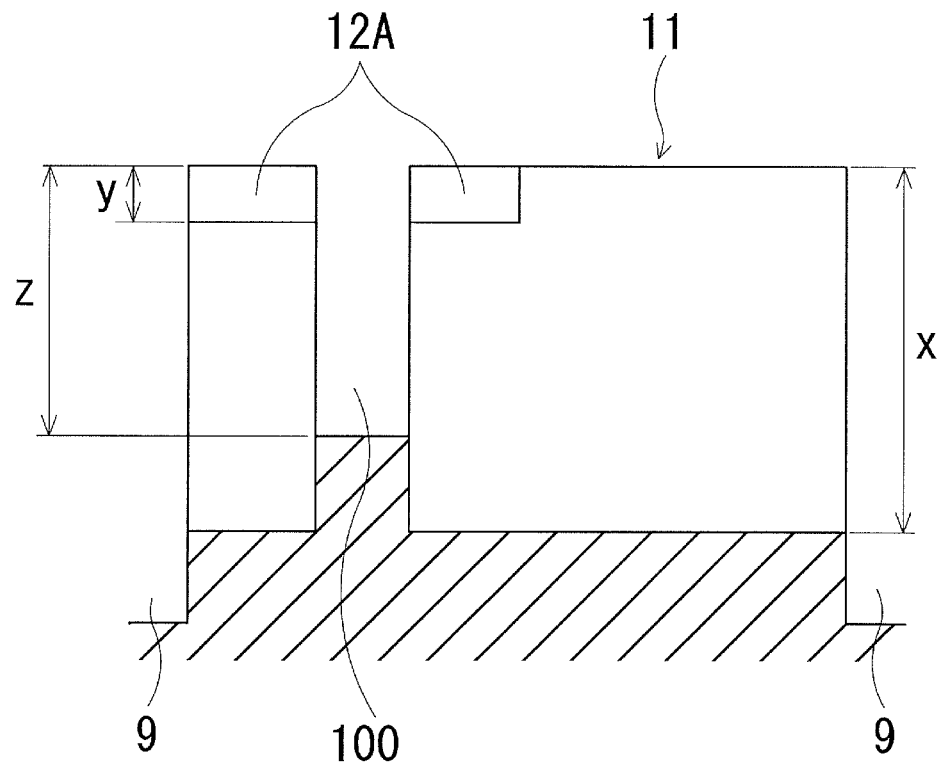
FIG. 6 is a cross-sectional view taken along the line Y-Y of FIG. 3.

FIG. 6 is a cross-sectional view cut out in the extending direction of the sipe 11. As illustrated in FIG. 6, when the maximum depth of the intersecting groove 100 is z (mm), it is preferable that the maximum depth z (mm) of the intersecting groove 100 and the maximum depth x (mm) of the sipe 11 satisfy the relationship of the following formula (2). It is particularly preferable to satisfy the relation x×0.5≤z≤x×0.8. Setting the maximum depth z (mm) of the intersecting groove 100 with respect to the maximum depth x (mm) of the sipe 11 appropriately in this manner enables the steering stability performance on dry road surfaces and the steering stability performance on wet road surfaces to be enhanced in a well-balanced manner.

$$x \times 0.2 \leq z \leq x \qquad (2)$$

Figure 7:
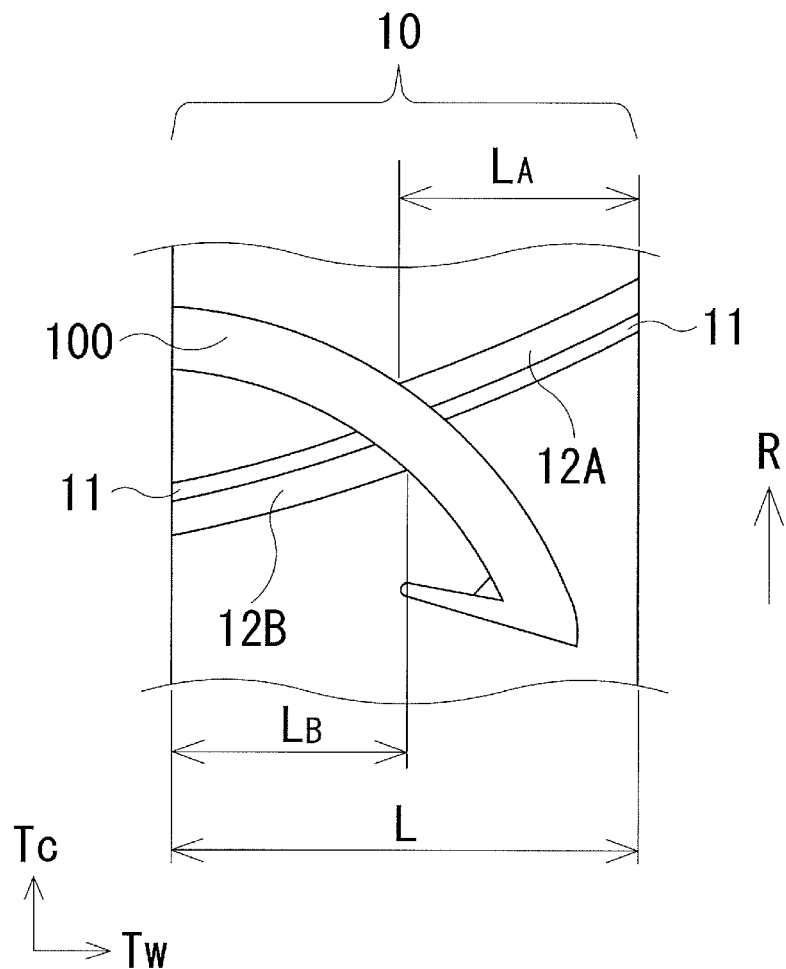
FIG. 7 is a plan view illustrating a modified example of a sipe, a chamfered portion thereof, and an intersecting groove formed in a tread portion of a pneumatic tire according to the present technology.

FIG. 7 illustrates a modified example of the sipe 11, the chamfered portion 12 thereof and the intersecting groove 100 formed in the tread portion of the pneumatic tire according to the present technology. As illustrated in FIG. 7, an intersecting groove 100 extending obliquely with respect to the tire circumferential direction is formed. One end of this intersecting groove 100 opens to the main groove 9, while the other end is bent toward this opening end and terminates within the rib 10. Namely, according to the present embodiment, at least one end of the intersecting groove 100 has a structure that opens to the main groove 9. Disposing the sipes 11 and the intersecting grooves 100 in this manner enables the drainability to be improved, thereby enabling the steering stability performance on wet road surfaces to be improved.

Figure 8A:
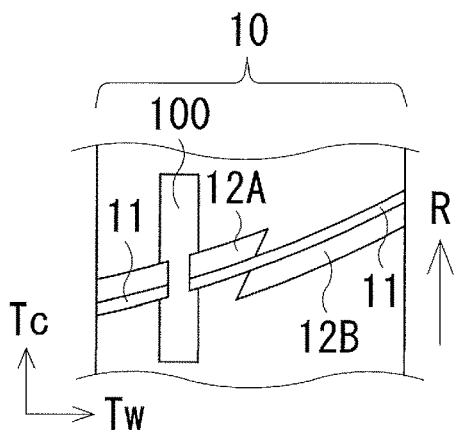
FIGS. 8A to 8E illustrate other modified examples of a sipe, a chamfered portion thereof, and an intersecting groove formed in a tread portion of a pneumatic tire according to the present technology.
Figure 8B:
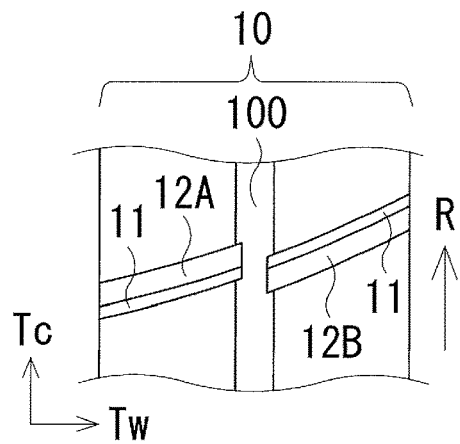
Figure 8C:
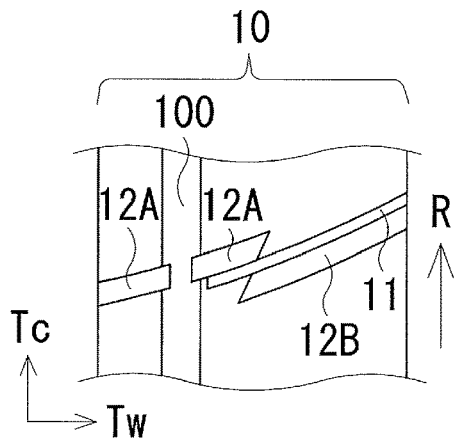
Figure 8D:
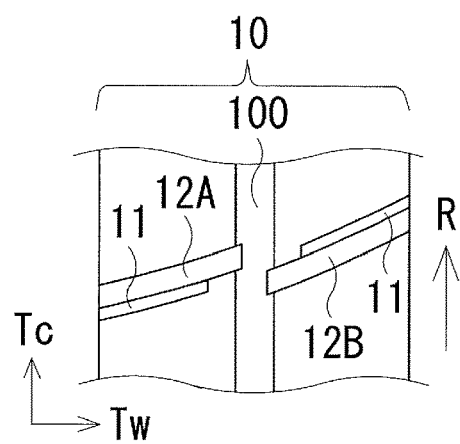
Figure 8E:
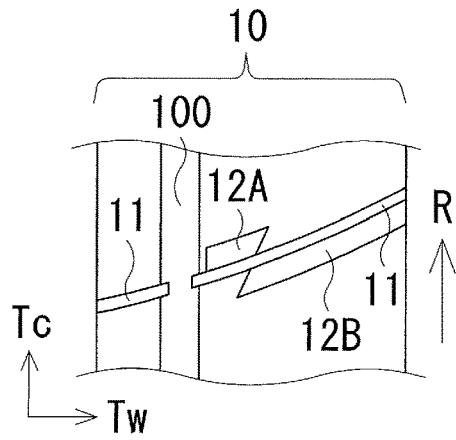

FIGS. 8A to 8E illustrate other modified examples of the sipe 11, the chamfered portion thereof 12, and the intersecting groove 100 formed in the tread portion of the pneumatic tire according to the present technology. With regard to shapes of the sipe 11 and the chamfered portion 12, in addition to that illustrated in FIGS. 2 to 4 and 7, FIG. 8A illustrates a case in which the intersecting groove 100 terminates at both ends in the tire circumferential direction within the rib 10, and the intersecting groove 100 intersects with the sipe 11 and the chamfered portion 12A. In contrast, the intersecting groove 100 illustrated in FIGS. 8B to 8E extends in the tire circumferential direction. With regard to shapes of the sipe 11 and the chamfered portion 12, FIG. 8B illustrates a case in which the intersecting groove 100 intersects with the sipe 11 and the chamfered portions 12A, 12B; FIG. 8C illustrates a case in which the intersecting groove 100 intersects with the chamfered portion 12A only; FIG. 8D illustrates a case in which the intersecting groove 100 intersects both with the chamfered portions 12A, 12B;

and FIG. 8E illustrates a case in which the intersecting groove 100 intersects with the sipe 11 only.

In the above-described pneumatic tire, it is preferable that the intersecting groove 100 intersects with both the sipe 11 and the chamfered portions 12. Disposing the sipe 11, the chamfered portions 12, and the intersecting groove 100 in this manner enables the drainability to be further improved, thereby enabling the steering stability performance on wet road surfaces to be effectively improved.

In the above-described pneumatic tire, as illustrated in FIGS. 2 and 3, a plurality of units including the sipe 11 and the chamfered portion 12 are arranged at intervals along the tire circumferential direction in the rib 10, and it is preferable that the intersecting groove 100 intersects with the sipe 11 or the chamfered portion 12 included in the plurality of units. Disposing the sipe 11, the chamfered portion 12, and the intersecting groove 100 in this manner enables the drainability to be improved, thereby enabling the steering stability performance on wet road surfaces to be improved.

It is particularly preferable that the intersecting groove 100 has a chamfered portion. Providing the chamfered portion in the intersecting groove 100 in this manner enables the steering stability performance on wet road surfaces to be effectively improved.

Further, the maximum value of the width of the intersecting groove 100 measured along the direction orthogonal to the intersecting groove 100 is set as the width W2. At this time, it is preferable that the maximum width W2 (mm) of the intersecting groove 100 satisfies the relationship of 1.5 mm<W2≤7.0 mm, more preferably 2.0 mm≤W2≤5.0 mm. Appropriately setting the maximum width W2 of the intersecting groove 100 in this manner enables the steering stability performance on dry road surfaces and the steering stability performance on wet road surfaces to be improved in a well-balanced manner.

Figure 9:
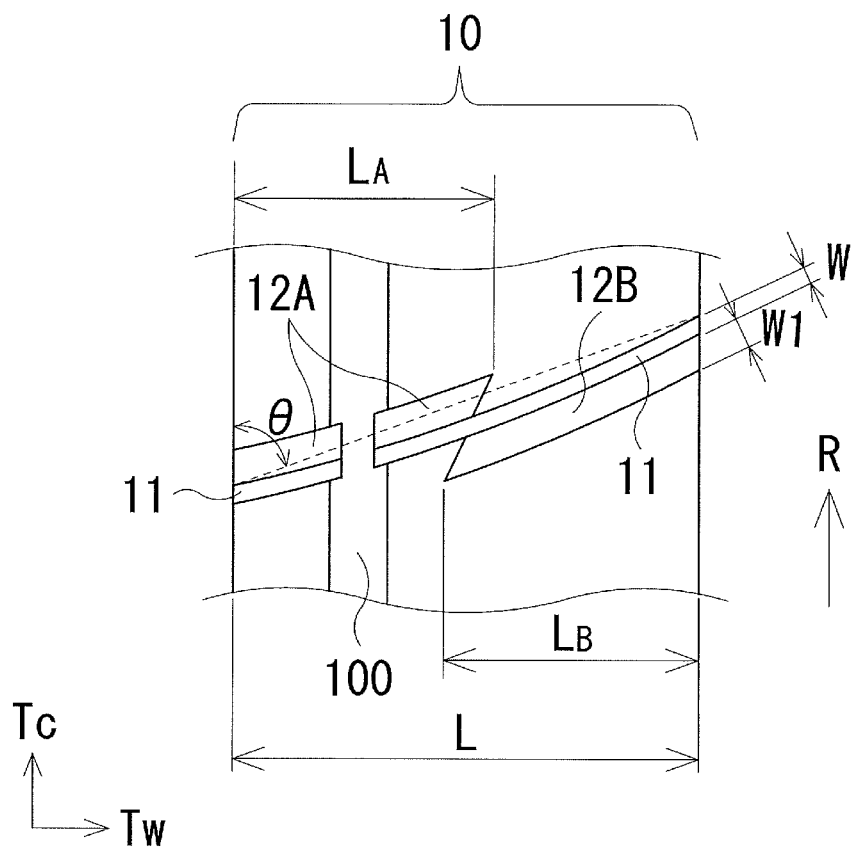
FIG. 9 is a plan view illustrating another modified example of a sipe, a chamfered portion thereof, and an intersecting groove formed in a tread portion of a pneumatic tire according to the present technology.

The sipe 11 illustrated in FIG. 9 is formed to have an inclination angle θ with respect to the tire circumferential direction. This inclination angle θ refers to an angle formed between a virtual line (a dotted line illustrated in FIG. 9) connecting both ends of the sipe 11 and a side face of the block 101. There is an inclination angle on the acute angle side and an inclination angle on the obtuse angle side, and the inclination angle θ on the acute angle side is illustrated in FIG. 9. The inclination angle θ is meant to be the inclination angle of the sipe 11 with an intermediate pitch in the rib 10. In this case, the inclination angle θ on the acute angle side is preferably 40° to 80°, and more preferably 50° to 70°. By inclining the sipe 11 with respect to the circumferential direction of the tire in this manner, the pattern rigidity can be improved, and the steering stability performance on dry road surfaces can be further improved. Here, when the inclination angle θ is smaller than 40°, the uneven wear resistance deteriorates, and when it exceeds 80°, the pattern rigidity cannot be sufficiently improved.

In the present technology, the side having the inclination angle θ on the acute angle side of the sipe 11 is defined as the acute angle side, and the side having the inclination angle θ on the obtuse angle side of the sipe 11 is defined as the obtuse angle side. The chamfered portions 12A and 12B formed on the edges 11A and 11B of the sipe 11 are formed on the acute angle side of the sipe 11. Chamfering the acute angle side of the sipe 11 as described above enables the uneven wear resistance performance to be further improved. Alternatively, the chamfered portions 12A and 12B may be formed on the obtuse angle side of the sipe 11. Forming the chamfered portion 12 on the obtuse angle side of the sipe 11 as described above enables the edge effect to be increased and the steering stability performance on wet road surfaces to be further improved.

In the present technology, having the entire shape of the sipe 11 curved as described above enables the steering stability performance to be improved on wet road surfaces. Further, a part of the sipe 11 may be curved or bent in a plan view. Forming the sipe 11 in this manner increases the total amount of the edges 11A, 11B in each sipe 11, enabling the steering stability performance on wet road surfaces to be improved.

As illustrated in FIGS. 2 and 3, the ends of the chamfered portions 12A and 12B positioned closer to the main groove 9 are respectively in communication with the main grooves 9 located on both sides of the rib 10. Forming the chamfered portions 12A and 12B in this manner enables the steering stability performance on wet road surfaces to be further improved. Alternatively, the ends of the chamfered portions 12A and 12B positioned closer to the main groove 9 may terminate in the rib 10 without communicating with the main groove 9. Forming the chamfered portions 12A and 12B in this way enables the steering stability performance on dry road surfaces to be further improved.

As illustrated in FIG. 9, one chamfered portion 12 is disposed on each of the edge 11A on the leading side and the edge 11B on the trailing side of the sipe 11. Having the chamfered portions 12 disposed in this manner enables the uneven wear resistance performance to be improved. Here, forming the chamfered portion 12 in two or more places on the edge 11A on the leading side and the edge 11B on the trailing side of the sipe 11 increases the number of nodes and tends to deteriorate the uneven wear resistance performance.

Here, the maximum value of the width of the chamfered portion 12 measured along the direction orthogonal to the sipe 11 is defined as a width W1. In this case, the maximum width W1 of the chamfered portion 12 is preferably 0.8 to 5.0 times, and more preferably 1.2 to 3.0 times, the sipe width W of the sipe 11. Setting the maximum width W1 of the chamfered portion 12 with respect to the sipe width W at an appropriate value in this manner enables the steering stability performance on dry road surfaces and the steering stability performance on wet road surfaces to be improved in a compatible manner. Here, when the maximum width W1 of the chamfered portion 12 is smaller than 0.8 times the sipe width W of the sipe 11, the improvement in steering stability performance on wet road surfaces is made insufficient, and if it is larger than 5.0 times, the improvement in steering stability performance on dry road surfaces is made insufficient.

Further, the outer edge portion in the longitudinal direction of the chamfered portion 12 is formed to be parallel to the extending direction of the sipe 11. Having the chamfered portion 12 extended in parallel with the sipe 11 in this manner enables the uneven wear resistance performance to be improved, and at the same time enables both the steering stability performance on dry road surfaces and the steering stability performance on wet road surfaces to be improved in a compatible manner.

Figure 10A:
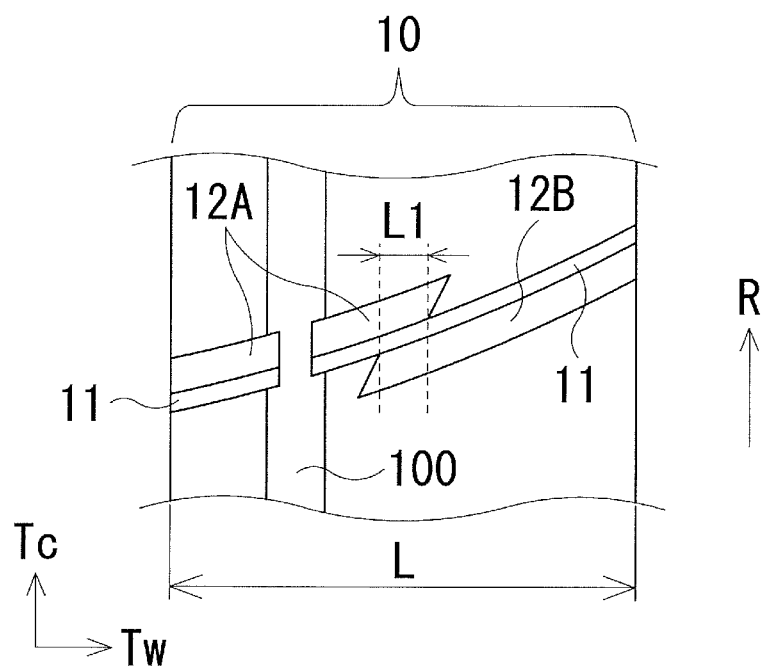
FIGS. 10A and 10B illustrate other modified examples of a sipe, a chamfered portion thereof, and an intersecting groove formed in a tread portion of a pneumatic tire according to the present technology.
Figure 10B:
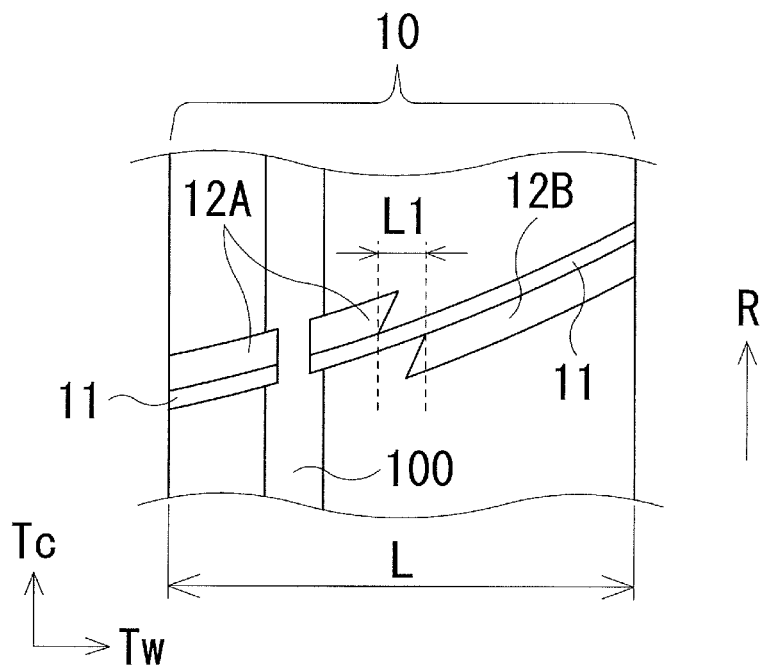

As illustrated in FIG. 10A, the chamfered portion 12A and the chamfered portion 12B are formed such that parts of both chamfered portions 12A, 12B overlap each other at the central portion of the sipe 11. Here, the length in the tire width direction of the overlap portion, which is a portion where the chamfered portion 12A and the chamfered portion 12B overlap, is set as an overlap length L1. On the other hand, as illustrated in FIG. 10B, in a case that either part of the chamfered portion 12A and the chamfered portion 12B does not overlap but is spaced apart from each other at a certain interval, the ratio of the sipe overlap length L1 to the sipe length L is expressed as a negative value. The overlap length L1 of the overlap portion is preferably from −30% to 30%, and more preferably from −15% to 15%, of the sipe length L. Appropriately configuring the overlap length L1 in the chamfered portion 12 with respect to the sipe length L in this manner enables the steering stability performance on dry road surfaces and the steering stability performance on wet road surfaces to be achieved in a compatible manner. Here, if the overlap length L1 is larger than 30%, the improvement in steering stability performance on dry road surfaces becomes insufficient, and if it is smaller than −30%, the improvement in steering stability performance on wet road surfaces becomes insufficient.

Figure 11:
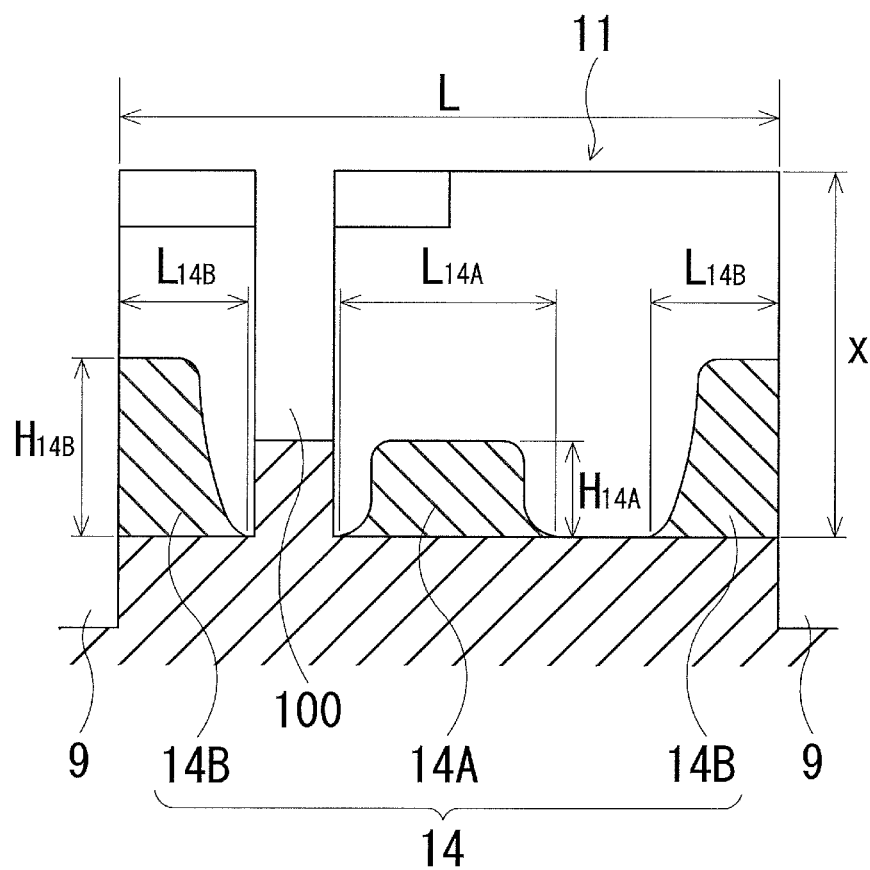
FIG. 11 is a cross-sectional view illustrating another modified example of the sipe and the intersecting groove formed in the tread portion of the pneumatic tire according to the present technology.

FIG. 11 is a cross-sectional view taken along the extending direction of the sipe 11 and in the vertical direction of the tread portion 1. As illustrated in FIG. 11, the sipe 11 has a raised bottom portion 14 in a part of its longitudinal direction. The raised bottom portion 14 includes a raised bottom portion 14A positioned at the central portion of the sipe 11, and a raised bottom portion 14B positioned at both ends of the sipe 11. Providing the raised bottom portion 14 in the sipe 11 in this manner enables improvement in steering stability performance on dry road surfaces and improvement in steering stability performance on wet road surfaces to be achieved in a compatible manner. The raised bottom portion 14 of the sipe 11 may be formed at an end portion and/or a non-end portion of the sipe 11.

The height of the raised bottom portion 14 in the tire radial direction formed in the sipe 11 is defined as a height $H_{14}$. The maximum value of the height from the groove bottom of the sipe 11 to the upper surface of the raised bottom portion 14A in the raised bottom portion 14A formed besides the end of the sipe 11 is set as the height $H_{14A}$. This height $H_{14A}$ is preferably 0.2 to 0.5 times, and more preferably 0.3 to 0.4 times, the maximum depth x of the sipe 11. Setting the height $H_{14A}$ of the raised bottom portion 14A disposed at a position other than the end of the sipe 11 at an appropriate height in this manner enables the rigidity of the block 101 to be improved and the drainage effect to be maintained, thereby improving the steering stability performance on wet road surfaces. Here, if the height $H_{14A}$ is smaller than 0.2 times the maximum depth x of the sipe 11, the rigidity of the block 101 cannot be sufficiently improved, and if it is larger than 0.5 times, the steering stability performance on wet road surfaces cannot be sufficiently improved.

In the raised bottom portion 14B formed at both ends of the sipe 11, the maximum value of the height from the groove bottom of the sipe 11 to the upper surface of the raised bottom portion 14B is set as the height $H_{14B}$. This height $H_{14B}$ is preferably 0.6 to 0.9 times, and more preferably 0.7 to 0.8 times, the maximum depth x of the sipe 11. Setting the height $H_{14B}$ of the raised bottom portion 14B formed at the end of the sipe 11 at an appropriate height in this manner enables the rigidity of the block 101 to be improved, enabling the steering stability performance on dry road surfaces to be improved. Here, if the height $H_{14B}$ is smaller than 0.6 times the maximum depth x of the sipe 11, the rigidity of the block 101 cannot be sufficiently improved, and if it is larger than 0.9 times, the steering stability performance on wet road surfaces cannot be sufficiently improved.

Further, the length in the tire width direction at the raised bottom portion 14 of the sipe 11 is set as the bottom raised length $L_{14}$. The raised lengths $L_{14A}$ and $L_{14B}$ of the raised bottom portions 14A and 14B are preferably 0.3 to 0.7 times, and more preferably 0.4 to 0.6 times, the sipe length L. Appropriately setting the raised lengths $L_{14A}$ and $L_{14B}$ of the raised bottom portions 14A and 14B in this manner enables improvement in steering stability performance on dry road surfaces and improvement in steering stability performance on wet road surfaces to be achieved in a compatible manner.

EXAMPLES

Pneumatic tires including a plurality of main grooves extending in the tire circumferential direction in a tread portion and sipes extending in the tire width direction in ribs defined by the main grooves and having a tire size of 245/40R19 were manufactured with the following items set as indicated in Tables 1 and 2 according to Conventional Examples 1, 2 and Examples 1 to 11: a chamfer arrangement (both sides or one side); a relationship between sipe length L and chamfered lengths $L_A$, $L_B$; whether the part facing the chamfered portion is chamfered; whether the intersecting groove is provided; a change in sipe width W; a maximum sipe depth x (mm); a chamfered portion maximum depth y (mm); a shape of intersecting groove; an intersection with intersecting groove; whether the chamfered portion is provided on the intersecting groove; an intersecting groove maximum depth z (mm); and an intersecting groove maximum width W2 (mm).

These test tires were tested by a test driver for a sensory evaluation of steering stability performance on dry road surfaces and steering stability performance on wet road surfaces, with the result also indicated in Tables 1 and 2.

Sensory evaluation on driving stability performance on dry road surfaces and steering stability performance on wet road surfaces was conducted by assembling each test tire to a rim size 19×8.5J wheel and mounting it on a vehicle with air pressure of 260 kPa. Evaluation results are expressed as index values, with the results of Conventional Example 1 being assigned an index value of 100. Larger index values indicate superior driving stability performance on dry road surfaces and superior driving steering stability performance on wet road surfaces.

TABLE 1-1

|  | Conventional Example 1 | Conventional Example 2 | Example 1 |
|---|---|---|---|
| Chamfer arrangement (both sides or one side) | Both sides | One side | Both sides |
| Relationship between sipe length L and chamfer length $L_A$, $L_B$ | $L > L_A, L_B$ | $L = L_A$ | $L > L_A, L_B$ |
| Whether part facing chamfered portion is chamfered | Yes | No | No |
| Whether intersecting groove is provided | No | No | Yes |
| Change in sipe width W | Constant | With change | With change |
| Sipe maximum depth x (mm) | 6 mm | 6 mm | 6 mm |
| Chamfered portion maximum depth y (mm) | 3 mm | 3 mm | 3 mm |
| Shape of intersecting groove | — | — | FIG. 8A |

TABLE 1-1-continued

|  |  | Conventional Example 1 | Conventional Example 2 | Example 1 |
|---|---|---|---|---|
| Intersection with intersecting groove | Sipe and/or chamfered portion | — | — | Sipe and chamfered portion |
|  | Single or multiple units | — | — | Single |
| Whether chamfered portion is provided on intersecting groove |  | — | — | No |
| Intersecting groove maximum depth z (mm) |  | — | — | 5 mm |
| Intersecting groove maximum width W2 (mm) |  | — | — | 3 mm |
| Dry road surface steering stability performance |  | 100 | 90 | 103 |
| Wet road surface steering stability performance |  | 100 | 105 | 103 |

TABLE 1-2

|  |  | Example 2 | Example 3 | Example 4 | Example 5 |
|---|---|---|---|---|---|
| Chamfer arrangement (both sides or one side) |  | Both sides | Both sides | Both sides | Both sides |
| Relationship between sipe length L and chamfer length $L_A$, $L_B$ |  | $L > L_A, L_B$ | $L > L_A, L_B$ | $L > L_A, L_B$ | $L > L_A, L_B$ |
| Whether part facing chamfered portion is chamfered |  | No | No | No | No |
| Whether intersecting groove is provided |  | Yes | Yes | Yes | Yes |
| Change in sipe width W |  | Constant | Constant | Constant | Constant |
| Sipe maximum depth x (mm) |  | 6 mm | 6 mm | 6 mm | 6 mm |
| Chamfered portion maximum depth y (mm) |  | 2 mm | 2 mm | 2 mm | 2 mm |
| Shape of intersecting groove |  | FIG. 8A | FIG. 7 | FIG. 4 | FIG. 4 |
| Intersection with intersecting groove | Sipe and/or chamfered portion | Sipe and chamfered portion | Sipe and chamfered portion | Sipe and chamfered portion | Sipe |
|  | Single or multiple units | Single | Single | Multiple | Multiple |
| Whether chamfered portion is provided on intersecting groove |  | No | No | No | No |
| Intersecting groove maximum depth z (mm) |  | 5 mm | 5 mm | 5 mm | 5 mm |
| Intersecting groove maximum width W2 (mm) |  | 3 mm | 3 mm | 3 mm | 3 mm |
| Dry road surface steering stability performance |  | 104 | 104 | 104 | 104 |
| Wet road surface steering stability performance |  | 104 | 106 | 106 | 103 |

TABLE 2-1

|  |  | Example 6 | Example 7 | Example 8 |
|---|---|---|---|---|
| Chamfer arrangement (both sides or one side) |  | Both sides | Both sides | Both sides |
| Relationship between sipe length L and chamfer length $L_A$, $L_B$ |  | $L > L_A, L_B$ | $L > L_A, L_B$ | $L > L_A, L_B$ |
| Whether part facing chamfered portion is chamfered |  | No | No | No |
| Whether intersecting groove is provided |  | Yes | Yes | Yes |
| Change in sipe width W |  | Constant | Constant | Constant |
| Sipe maximum depth x (mm) |  | 6 mm | 6 mm | 6 mm |
| Chamfered portion maximum depth y (mm) |  | 2 mm | 2 mm | 2 mm |
| Shape of intersecting groove |  | FIG. 4 | FIG. 7 | FIG. 4 |
| Intersection with intersecting groove | Sipe and/or chamfered portion | Chamfered portion | Sipe and chamfered portion | Sipe and chamfered portion |
|  | Single or multiple units | Multiple | Multiple | Multiple |
| Whether chamfered portion is provided on intersecting groove |  | No | No | Yes |
| Intersecting groove maximum depth z (mm) |  | 5 mm | 5 mm | 5 mm |
| Intersecting groove maximum width W2 (mm) |  | 3 mm | 3 mm | 3 mm |
| Dry road surface steering stability performance |  | 104 | 104 | 104 |
| Wet road surface steering stability performance |  | 103 | 107 | 107 |

TABLE 2-2

|  | Example 9 | Example 10 | Example 11 |
|---|---|---|---|
| Chamfer arrangement (both sides or one side) | Both sides | Both sides | Both sides |
| Relationship between sipe length L and chamfer length $L_A$, $L_B$ | $L > L_A, L_B$ | $L > L_A, L_B$ | $L > L_A, L_B$ |
| Whether part facing chamfered portion is chamfered | No | No | No |
| Whether intersecting groove is provided | Yes | Yes | Yes |
| Change in sipe width W | Constant | Constant | Constant |
| Sipe maximum depth x (mm) | 6 mm | 6 mm | 6 mm |

TABLE 2-2-continued

|  | | Example 9 | Example 10 | Example 11 |
|---|---|---|---|---|
| Chamfered portion maximum depth y (mm) | | 2 mm | 2 mm | 2 mm |
| Shape of intersecting groove | | FIG. 4 | FIG. 4 | FIG. 4 |
| Intersection with intersecting groove | Sipe and/or chamfered portion | Sipe and chamfered portion | Sipe and chamfered portion | Sipe and chamfered portion |
| | Single or multiple units | Multiple | Multiple | Multiple |
| Whether chamfered portion is provided on intersecting groove | | Yes | Yes | Yes |
| Intersecting groove maximum depth z (mm) | | 7 mm | 1 mm | 5 mm |
| Intersecting groove maximum width W2 (mm) | | 3 mm | 3 mm | 8 mm |
| Dry road surface steering stability performance | | 100 | 106 | 100 |
| Wet road surface steering stability performance | | 109 | 102 | 109 |

As can be seen from these Tables 1 and 2, by devising the shape of the chamfered portion formed in the sipe, the tires of Examples 1 to 8 improved the steering stability performance on dry road surfaces and the steering stability performance on wet road surfaces in a well-balanced manner. In the tire of Example 9, since the maximum depth z (mm) of the intersecting groove was set relatively large, the steering stability performance on wet road surfaces was greatly improved, whereas in the tire of Example 10, since the maximum depth z (mm) of the intersecting groove was set relatively small, the steering stability performance on dry road surfaces was greatly improved. Furthermore, since the maximum width W2 (mm) of the intersecting groove of the tire of Example 11 was set large, the steering stability performance on wet road surfaces was greatly improved.

The invention claimed is:

1. A pneumatic tire comprising:
a plurality of main grooves extending in a tire circumferential direction in a tread portion; and
a sipe extending in a tire width direction in a rib defined by the main grooves,
the sipe comprising a leading side edge and a trailing side edge,
a chamfered portion shorter than a sipe length of the sipe being formed in each of the leading side edge and the trailing side edge,
a non-chamfered region comprising no other chamfered portion being present in a part facing each chamfered portion of the sipe,
the rib comprising an intersecting groove intersecting with at least one out of the sipe or one of the chamfered portions, the intersecting groove extending across the at least one out of the sipe or the one of the chamfered portions, and extending away from the at least one out of the sipe or the one of the chamfered portions on each side of the at least one out of the sipe or the one of the chamfered portions,
only one of the chamfered portions being present on each of the edges of the leading side and the trailing side of the sipe,
a sipe width of the sipe being 1.5 mm or less, and
each of the chamfered portions have a sipe edge where the chamfered portions intersect the sipe and an opposite edge opposite the sipe edge, where the opposite edge projects further inward into the rib in the tire width direction, away from the main grooves from which the sipe extends, than the sipe edge.

2. The pneumatic tire according to claim 1, wherein, a maximum depth x (mm) of the sipe and a maximum depth y (mm) of each of the chamfered portions satisfy a relationship of a following formula (1), and a sipe width of the sipe is constant in a range from an end positioned inward of each of the chamfered portions in a tire radial direction to a groove bottom of the sipe:

$$x \times 0.1 \leq y \leq x \times 0.3 + 1.0 \quad (1).$$

3. The pneumatic tire according to claim 1, wherein,
at least one end of the intersecting groove opens to one of the main grooves.

4. The pneumatic tire according to claim 1, wherein,
the intersecting groove extends along a tire circumferential direction.

5. The pneumatic tire according to claim 1, wherein,
the intersecting groove intersects with both the sipe and the one of the chamfered portions.

6. The pneumatic tire according to claim 1, wherein,
the rib comprises a plurality of units comprising the sipe and the chamfered portions, and
the intersecting groove intersects with a sipe or a chamfered portion of each of the plurality of units.

7. The pneumatic tire according to claim 1, wherein,
the intersecting groove comprises a chamfered portion.

8. The pneumatic tire according to claim 1, wherein,
a maximum depth z (mm) of the intersecting groove and a maximum depth x (mm) of the sipe satisfy a relationship of a following formula (2):

$$x \times 0.2 \leq z \leq x \quad (2).$$

9. The pneumatic tire according to claim 1, wherein,
a maximum width W2 (mm) of the intersecting groove satisfies a relationship of 1.5 mm<W2≤7.0 mm.

10. The pneumatic tire according to claim 2, wherein,
at least one end of the intersecting groove opens to one of the main grooves.

11. The pneumatic tire according to claim 2, wherein,
the intersecting groove extends along a tire circumferential direction.

12. The pneumatic tire according to claim 11, wherein,
the intersecting groove intersects with both the sipe and the one of the chamfered portion.

13. The pneumatic tire according to claim 12, wherein,
the rib comprises a plurality of units comprising the sipe and the chamfered portions, and
the intersecting groove intersects with a sipe or a chamfered portion of each of the plurality of units.

14. The pneumatic tire according to claim 13, wherein,
the intersecting groove comprises a chamfered portion.

15. The pneumatic tire according to claim 14, wherein,
a maximum depth z (mm) of the intersecting groove and a maximum depth x (mm) of the sipe satisfy a relationship of a following formula (2):

$$x \times 0.2 \leq z \leq x \quad (2).$$

16. The pneumatic tire according to claim 15, wherein, a maximum width W2 (mm) of the intersecting groove satisfies a relationship of 1.5 mm<W2≤7.0 mm.

* * * * *